No. 786,101. PATENTED MAR. 28, 1905.
L. A. COOPER.
SKIMMER.
APPLICATION FILED MAR. 19, 1903. RENEWED FEB. 17, 1905.
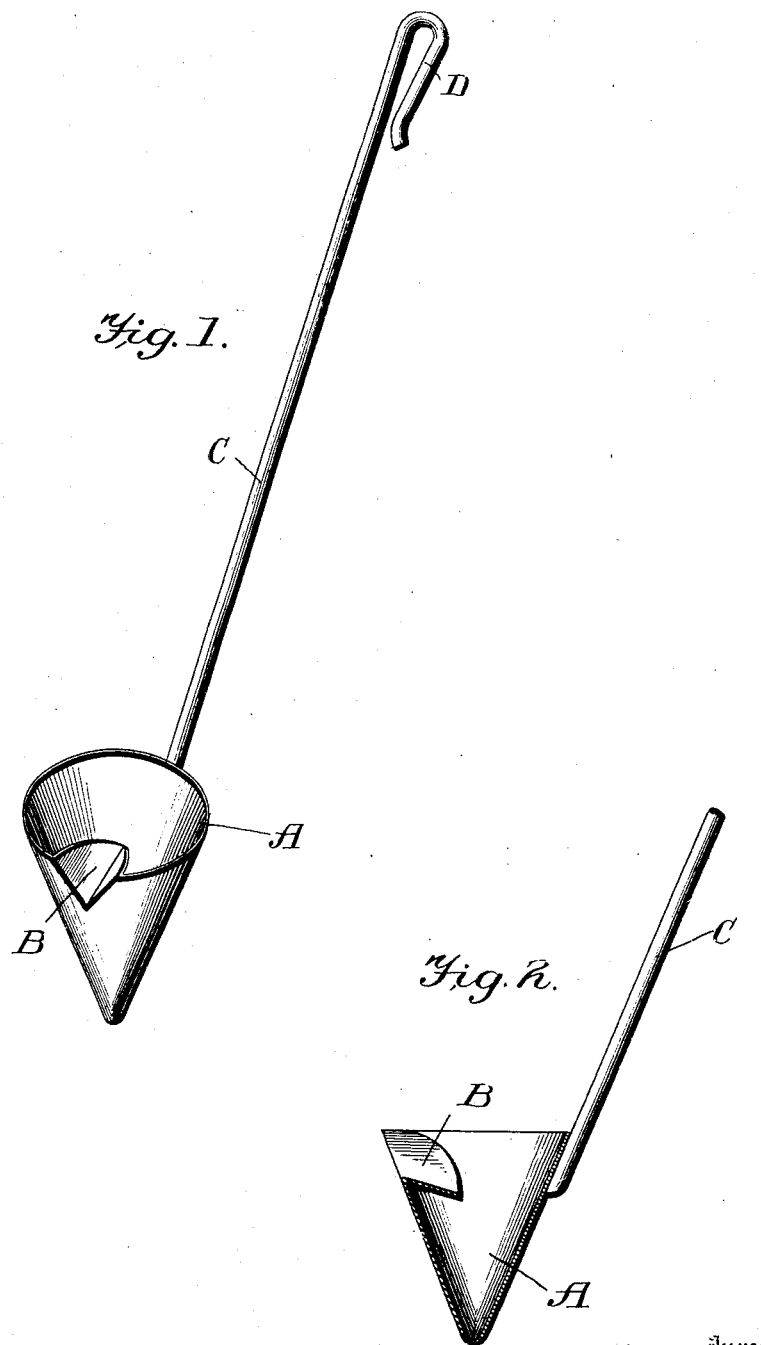

No. 786,101. Patented March 28, 1905.

UNITED STATES PATENT OFFICE.

LOUIS A. COOPER, OF SENECA, NEW YORK.

SKIMMER.

SPECIFICATION forming part of Letters Patent No. 786,101, dated March 28, 1905.

Application filed March 19, 1903. Renewed February 17, 1905. Serial No. 246,122.

*To all whom it may concern:*

Be it known that I, LOUIS A. COOPER, a citizen of the United States, residing at Seneca, in the county of Ontario and State of New York, have invented certain new and useful Improvements in Skimmers; and I do hereby declare the following to be a full, clear, and exact description of the invention, such as will enable others skilled in the art to which it appertains to make and use the same.

My invention relates to skimmers intended to separate cream from milk, and is especially intended to remove the cream from the top of the milk in an ordinary milk-jar.

My invention will be understood by reference to the accompanying drawings, in which the same parts are indicated by the same letters in both views, in which—

Figure 1 is a perspective view; and Fig. 2, a longitudinal section through the bowl of the skimmer, the handle being shown in elevation.

A represents the bowl of the skimmer, which is preferably made conical and provided with a V-shaped inlet B in one side thereof, which preferably tapers downward slightly.

C represents the handle, which may be of any desired construction, but is preferably made of a rod bent over, as at D, for convenience in hanging up the skimmer.

To use the skimmer, it is gently inserted in the neck of the jar until the inlet B is just below the layer of cream, when the cream will flow into the conical bowl and may be removed. If there is much cream in the jar, the operation may be repeated.

There is a decided advantage in having the V-shaped opening at one side of the upper edge of the skimmer. As well known, the cream lies upon the milk in the form of a thin layer and it is a difficult matter to get the cream off without getting quite a large quantity of milk also. By providing a V-shaped inlet, as shown, with the point directed downward it is possible to insert the skimmer gently and have the cream flow thereinto, with only a very little quantity of the milk. The adjustment may be made to a nicety, and if any milk does happen to flow in it has to flow near the point of the inlet, so that a comparatively small quantity of milk in any case will enter the skimmer.

Having thus described my invention, what I claim, and desire to secure by Letters Patent of the United States, is—

1. A skimmer comprising a tapering bowl, a V-shaped inlet at one side thereof below the upper edge thereof, and a handle secured to said bowl, substantially as described.

2. A skimmer comprising a conical bowl, a trough-shaped inlet projecting into said bowl from one side thereof, and a handle secured to said bowl, substantially as described.

3. A skimmer comprising a tapering bowl with a trough-shaped inlet projecting into said bowl, and slanting downward, and a handle secured to said bowl, substantially as described.

In testimony whereof I affix my signature in presence of two witnesses.

LOUIS A. COOPER.

Witnesses:
   E. J. COOK,
   C. H. CONGDON.